(12) United States Patent
Reisner

(10) Patent No.: US 9,854,258 B2
(45) Date of Patent: Dec. 26, 2017

(54) VIDEO QUALITY THROUGH COMPRESSION-AWARE GRAPHICS LAYOUT

(71) Applicant: Disney Enterprises, Inc., Burbank, CA (US)

(72) Inventor: Samuel Joseph Reisner, Bristol, CT (US)

(73) Assignee: Disney Enterprises, Inc., Burbank, CA (US)

( * ) Notice: Subject to any disclaimer, the term of this patent is extended or adjusted under 35 U.S.C. 154(b) by 279 days.

(21) Appl. No.: 14/148,132

(22) Filed: Jan. 6, 2014

(65) Prior Publication Data

US 2015/0195547 A1    Jul. 9, 2015

(51) Int. Cl.
| H04N 11/02 | (2006.01) |
| H04N 19/27 | (2014.01) |
| H04N 19/12 | (2014.01) |
| H04N 19/136 | (2014.01) |
| H04N 19/17 | (2014.01) |
| H04N 19/167 | (2014.01) |

(52) U.S. Cl.
CPC ............ *H04N 19/27* (2014.11); *H04N 19/12* (2014.11); *H04N 19/136* (2014.11); *H04N 19/17* (2014.11); *H04N 19/167* (2014.11)

(58) Field of Classification Search
CPC ..................................................... H04N 19/27
USPC ....................................... 375/240.01–240.29
See application file for complete search history.

(56) References Cited

U.S. PATENT DOCUMENTS

| 5,437,008 | A | * | 7/1995 | Gay | G06T 11/60 345/677 |
| 5,818,535 | A | * | 10/1998 | Asnis | H04N 19/503 348/416.1 |
| 6,038,276 | A | * | 3/2000 | Dinh | H03L 7/095 327/156 |
| 6,157,396 | A | * | 12/2000 | Margulis | G06T 1/20 345/506 |
| 6,468,217 | B1 | * | 10/2002 | Fazioli | G01S 15/899 386/E5.072 |
| 6,557,001 | B1 | * | 4/2003 | Dvir | H04N 21/4126 |
| 7,698,724 | B1 | * | 4/2010 | Day | H04N 7/17336 725/101 |
| 2001/0024239 | A1 | * | 9/2001 | Feder | H04N 7/165 348/423.1 |
| 2002/0178278 | A1 | * | 11/2002 | Ducharme | H04N 7/17318 709/231 |
| 2003/0219163 | A1 | * | 11/2003 | Kelly | G06T 9/001 382/245 |
| 2004/0218893 | A1 | * | 11/2004 | Karimoto | H04N 21/42661 386/335 |
| 2005/0018770 | A1 | * | 1/2005 | Adolph | H04N 19/61 375/240.16 |

(Continued)

*Primary Examiner* — Leron Beck
(74) *Attorney, Agent, or Firm* — Ference & Associates LLC

(57) ABSTRACT

An embodiment provides a method, including: identifying a first type of media and a second type of media; determining a compression technique to be used to compress a combined media created from the first type of media and the second type of media; and aligning using a processor, based on the compression technique determined, the first type of media and the second type of media to create the combined media. Other aspects are described and claimed.

21 Claims, 3 Drawing Sheets

(56) References Cited

U.S. PATENT DOCUMENTS

| | | | |
|---|---|---|---|
| 2006/0095472 A1* | 5/2006 | Krikorian | H04N 21/4398 |
| 2008/0170622 A1* | 7/2008 | Gordon | H04N 21/23412 |
| | | | 375/240.18 |
| 2011/0216829 A1* | 9/2011 | Raveendran | H04N 19/40 |
| | | | 375/240.12 |
| 2012/0076197 A1* | 3/2012 | Byford | H04N 19/00 |
| | | | 375/240.01 |
| 2015/0007236 A1* | 1/2015 | Dureau | H04N 21/47217 |
| | | | 725/88 |

* cited by examiner

VIDEO QUALITY THROUGH COMPRESSION-AWARE GRAPHICS LAYOUT

BACKGROUND

In media data, e.g., television broadcast video data (analog or digital), compression, for example according to an MPEG video compression standard, is often applied at some point, e.g., prior to transmission (or retransmission), such that the amount of media data (e.g., transmitted, stored, etc.) is reduced. It is common for a content creator or others, e.g., television broadcasters, to insert graphical elements, e.g., logos or other text or imagery, into the media data at various times. This allows for customization of the media data, e.g., insertion of identifying logos or watermarks overlaid on video data, inclusion of additional information in graphics such as included in a graphical overlay, etc.

BRIEF SUMMARY

In summary, one embodiment provides a method, comprising: identifying a first type of media and a second type of media; determining a compression technique to be used to compress a combined media created from the first type of media and the second type of media; and aligning using a processor, based on the compression technique determined, the first type of media and the second type of media to create the combined media.

Another aspect provides an apparatus, comprising: a processor; and a memory storing instructions executable by the processor to: identify a first type of media and a second type of media; determine a compression technique to be used to compress a combined media created from the first type of media and the second type of media; and align the first type of media and the second type of media in the combined media based on the compression technique determined.

A further aspect provides a product, comprising: a storage device storing code executable by a processor of an apparatus, the code comprising: code that identifies a first type of media and a second type of media; code that determines a compression technique to be used to compress a combined media created from the first type of media and the second type of media; and code that aligns the first type of media and the second type of media based on the compression technique determined, to create the combined media.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1A:
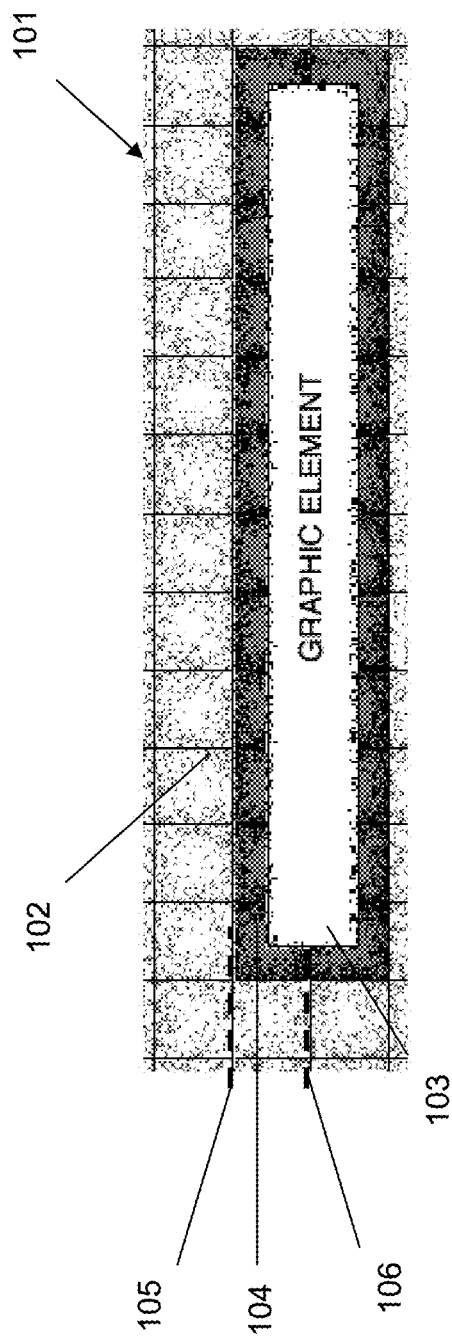
FIG. 1A illustrates an example of a misaligned graphical element and video data with compression artifacts resulting therefrom.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Media data of a first type, e.g., video or image data, is often combined with media of a second type, e.g., an overlaid graphical element. This combined media, while being useful in that it customizes the media, conveys additional information when rendered, etc., also exhibits increased compression artifacts in regions where one media element type adjoins or abuts another, e.g., at the border or boundary of video data and overlaid graphical elements. This is due to the disparity of different types of media, e.g., in terms of content and motion, in that region of the media data. Thus, for example, graphical elements tend to show increased evidence of compression near their borders with video data.

Accordingly, an embodiment aligns media types in a compression aware technique. For example, an embodiment permits an overlaid graphical element to be repositioned slightly within the combined media such that compression artifacts are reduced or eliminated in the border regions where the media types adjoin one anther. An embodiment may, for example, automatically align a graphical element such that it lies within known macro-blocks of a given compression technique, thereby reducing compression artifacts in the resultant compressed, combined media, e.g., after decompression and rendering thereof on a display device.

The illustrated example embodiments will be best understood by reference to the figures. The following description is intended only by way of example, and simply illustrates certain example embodiments.

FIG. 1A illustrates a small portion of combined media data 101 as it appears when rendered on screen. In the example of FIG. 1A, the combined media data 101 includes the combination of video and graphics that appears in the lower portion of a television display/rendering. The combined media 101 therefore includes media data of a first type, here a video, and media data of a second type, in this example a graphical overlay 103 presenting additional information.

Figure 1B:
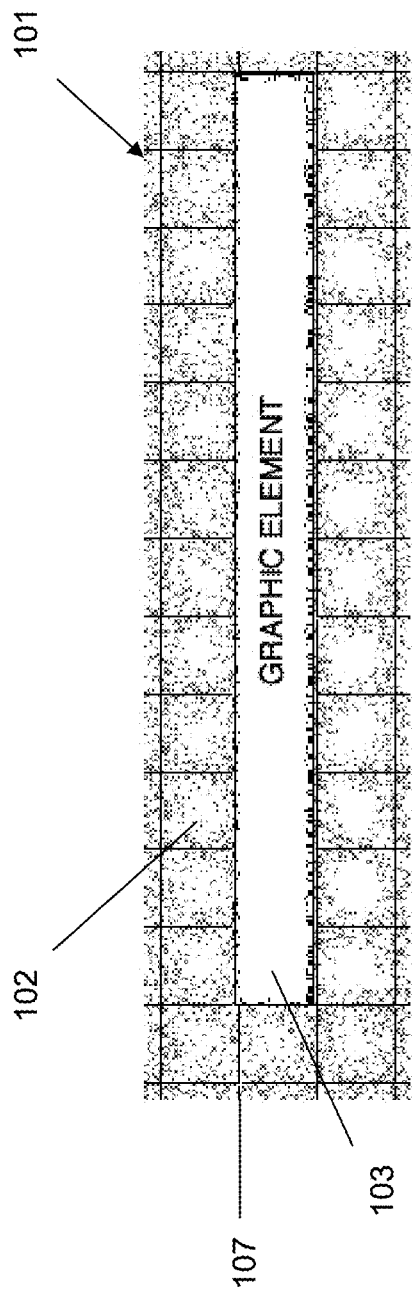
FIG. 1B illustrates an example of a re-aligned graphical element and video data without compression artifacts.

This combined media data 101 has been formed, e.g., via a technician placing the graphical element 103 as an overlay to the underlying video feed 102, and thereafter compressed according to a compression technique, e.g., MPEG2 or another compression technique such as H.264. The underlying grid pattern in FIG. 1A and FIG. 1B illustrates the compression regions or macro-blocks of the compression technique. The combined, compressed media 101 is transmitted from the content creator, e.g., television broadcast station, to another location, e.g., local re-distribution station. The combined media 101 is thus compressed in order to reduce the amount of data that is transmitted.

The result of such compression of the combined media 101, however, is that compression artifacts are produced. These tend to be most pronounced in the area where two types of media (e.g., the video 102 and graphical overlay element 103) adjoin, as indicated in the example of FIG. 1A at 104. The compression artifacts are increased because this border or adjoining region 104 lies within a macro-block defined by the compression technique utilized, e.g., MPEG2 or other technique. The lines 105, 106 of FIG. 1A illustrate the boundaries of the macro-blocks, where it is clear that the adjoining region of the media types at 104 lies within a macro-block defined by the compression technique. Thus, this region of compression contains two media types 102, 103.

As illustrated in FIG. 1A, compression artifacts such as blurring or other distortions result in the area 104 when the combined media 101 is thereafter decompressed and rendered on-screen. For example, the area 104 where the video media type 102 and the graphical overlay media type 103 meet is distorted in the combined media 101 in the rendering. This again results from the border or adjoining area 104 of two types of media elements within a region or macro-block of the compression technique that is independently compressed.

For example, MPEG2 (and other compression techniques such as H.264) break a picture down into regions which are compressed independently, referred to herein as "macro-blocks". The quality of the video within those regions, e.g., region 104 of FIG. 1A determines how much data will be allocated to representing that portion of the image. Additionally, the methods of encoding each small region may differ from one to another.

If a region has two different types of media (e.g., based on content or motion), the compression region will require more bandwidth to compress and the results of compression are poor compared to compression of a region having media of one type. A place where this may be observed is in broadcaster's rendered (on-screen) content at the boundary between a ticker overlay graphical element and the video. The compression artifacts tend to be most noticeable as a region of blurriness in the rendering of the video while the video is playing but may still be appreciated in still images.

Accordingly, an embodiment allows for aligning the media types such that two media types do not lie within a given compression region (again referred to herein as a macro-block which is to be construed as inclusive of all such terms used to refer to independently compressed regions). This alignment is illustrated in FIG. 1B. Here, the combined media 101 includes the first media type 102 and the second media type 103, where the media types 102 and 103 have been aligned to adjoin substantially coincident at the macro-block region 107. This alignment results in reduced artifacts being produced, as further described herein.

Figure 2:
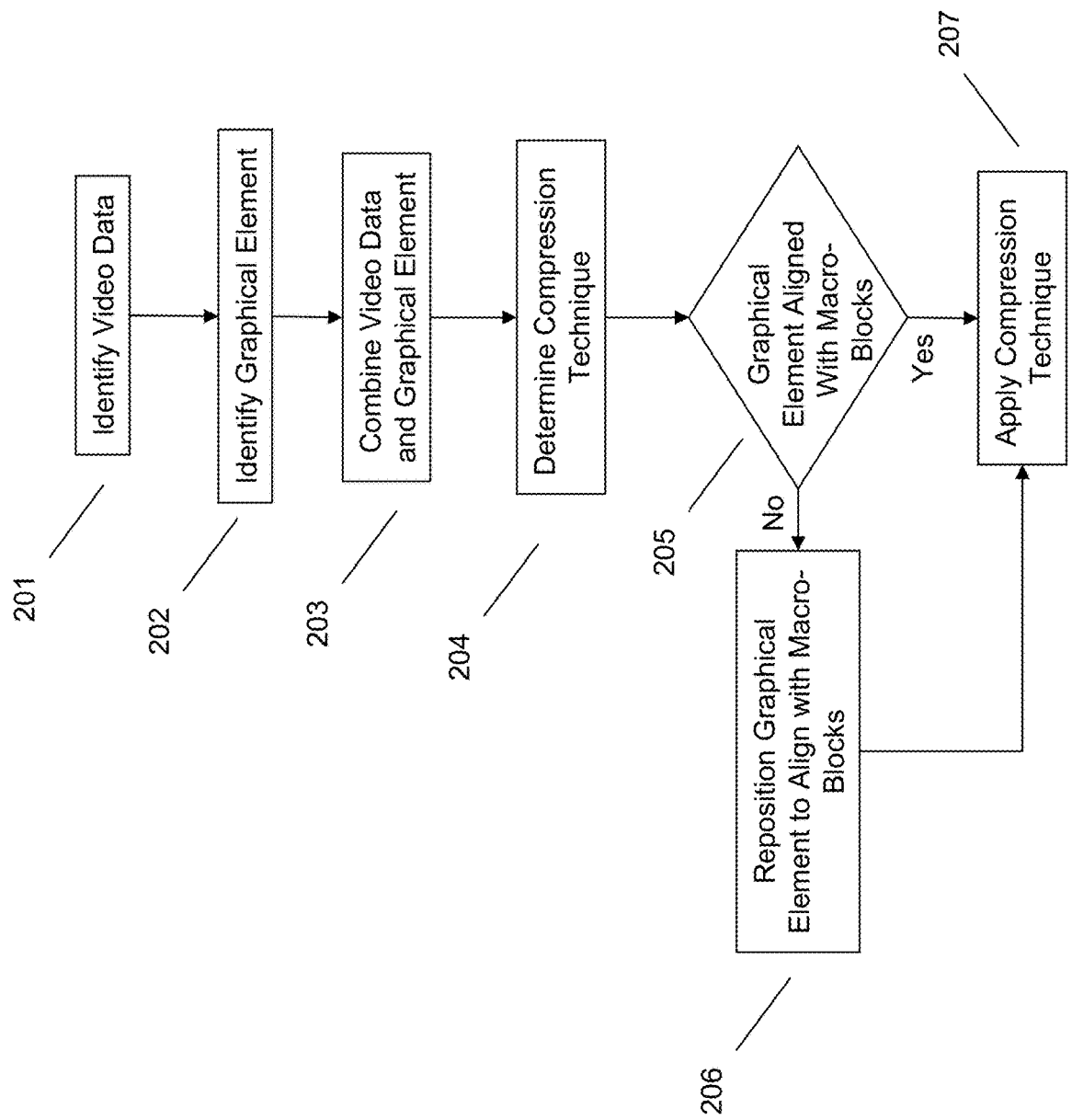
FIG. 2 illustrates an example method of compression aware media alignment.

Referring to FIG. 2, an embodiment identifies a first media type, e.g., video data, at 201, and a second media type, e.g., a graphical element at 202. The types of media identified may be different, i.e., other than video or graphical elements, such as media types that differ based on motion, content, their treatment or handling by a compression technique, etc. Additionally, the media types may be identified in a variety of ways. For example, the media types may be explicitly identified using a user input or via media metadata. The media types may be identified automatically or without user input, e.g., via obtaining the media types from different sources or locations, by analyzing characteristics of the media in order to distinguish types, etc. Moreover, the identification may take place at various times, e.g., prior to forming combined media, after media having two or more types has been combined, etc.

For example, media types may be identified prior to or as part of the process of forming the combined media at 203. For example, the media may be combined by a technician overlaying a graphical element onto video data as part of a content creation process.

Irrespective of how media types are categorized or identified, or when, once two or more media types have been identified, an embodiment may align the two media types according to a compression-aware technique. For example, an embodiment may determine a compression technique that will be utilized to compress (or re-compress) the combined media having two or more media types at 204. Again, the determining of the compression technique or techniques to be used may take place in a variety of ways or at a variety of times. By way of example, an embodiment may select a predetermined standard compression technique automatically or a user may provide a selection of a compression technique to be taken into account when aligning the media.

Having a compression technique determined, an embodiment may then determine if the media types are appropriately aligned at 205. For example, an embodiment may determine if the graphical element border region, i.e., the portion of the graphical element adjoining the underlying video, lies within a macro-block of the combined media given the compression technique determined. That is, knowing the compression technique, an embodiment will be aware of the macro-block layout of that technique. Thus, an embodiment may map the macro-blocks to the combined media to determine if the relative position of the graphical element is appropriate at 205.

If the graphical element is misaligned given the macro-block layout of the compression technique determined, e.g., a border of the graphical element lies within a macro-block region, an embodiment may reposition the graphical element to be substantially aligned with the macro-block border at 206. This may include, for example, moving the graphical element slightly to reposition its appearance in the combined media such that the graphical element ends at or near the position at which a macro-block ends. Thus, one type of media (in this case, either the graphical element or the video) will fall within any given macro-block or region to be used for compression.

An embodiment may thereafter compress the combined media at 207 having repositioned the media types to fall separately within the macro-blocks. This reduces or eliminates the visible compression artifacts when the combined media is later decompressed and rendered, e.g., on a television.

In an embodiment, a user may have the repositioning automatically applied, e.g., after first or initially grossly positioning the media types for overall visual appearance. Thus, a technician may provide inputs to select and initially position a graphical overlay to form the combined media. An embodiment may thereafter reposition or "snap" the graphical element into proper alignment or position, i.e., taking into account the compression technique that will be used to compress the combined media. For example, for a compression technique using macroblocks, for example, the graphic will be placed in a location that most closely approximates the location a user manipulates for placement while optimizing the alignment with the macroblocks used by the compression technique. If the user modifies the location of the graphic such that a different set of macroblocks is closer to the modified location, the graphic will be relocated to this second macroblock optimized location. It is possible for a manual repositioning to be employed, e.g., using awareness of the primary downstream compression format(s) to locate graphical elements such that the boundaries between video and graphics occur at compression region/macro-block locations. This may include, for example, providing an indication, e.g., view of gridlines aligned with the macro-block locations of the compression technique such that the user is apprised thereof.

At various levels or times a user may retain control over the aligning or repositioning of the media types. For example, an embodiment may allow a user to select from among different positions aligned with macro-blocks into which a graphical element is snapped based on compression scheme(s) (e.g., MPEG2, H.264, etc.). This may be done a number of times, e.g., allowing the user to preview the results of the graphical element repositioning or alignment for various compression techniques when laying out a design. For example, if a user selects a given compression technique, e.g., MPEG2, an embodiment may display snap indicators that correspond to a 16×16 grid of MPEG2 macro-blocks. A user may then snap the graphical element into place according to these gridlines and thereafter select another compression technique and repeat this process.

It is worth noting that although "macro-blocks" are used to refer to compression regions, this is an inclusive term as used herein and meant to include other compression regions, e.g., block-level compression regions, e.g., 8×8 pixel grid for MPEG2.

Accordingly, an embodiment provides techniques for aligning media types, e.g., graphical element overlays and video data, such that the combined media, when compressed, decompressed and thereafter rendered on screen contains fewer compression artifacts. An embodiment therefore determines a placement of graphics in a video stream according to the particular compression technique or scheme (codec) being used for the video. A goal is to align the media types appropriately in a compression-aware way, e.g., such that a graphic is aligned with a portion of the image that is compressed as a unit ("macro-block") to make the compression most efficient and avoid blurry regions at the edge of the graphic.

Compression efficiency will be improved using such compression-aware aligning. The efficiency may be viewed as, rather than strictly attempting to save overall bandwidth, allocating the available bandwidth most efficiently, e.g., to use more bits to more salient regions of the combined content. This may be especially applicable to certain sub-areas of the content, e.g., moving graphics such as the bottom area of rendered content containing moving graphics such as news tickers or sports scores or the primary video content. This may be particularly so in the case of large screen/high resolution applications where the encoding artifacts may be more noticeable, although the aligning may be used in small screen or lower-resolution/lower bandwidth applications as well.

As described herein, an embodiment may be implemented as a program or application that provides "snap-to" grids customized for the macro-block arrangements of each particular compression technique/codec. This application may be automated or controlled by a user. For example, when the user places a graphic, a snap grid (with or without a visible indication thereof) pulls or repositions the media type, e.g., graphic, into alignment with the closest macro-block. The user may retain control over the application, e.g., may override the placement, e.g., via turning the grid off, as for example in a case the user does not like where the media is repositioned to for aesthetic reasons, etc.

Moreover, the alignment or repositioning may be modified, e.g., via user selection or other indicator indicating the particular compression or encoding technique being used, with appropriate adjustment to the repositioning/aligning (or grid). This again may result because each compression or encoding technique may have different macro-block configurations. The video quality that results from such compression-aware alignment improves due to fewer compression artifacts.

An embodiment may be implemented using a variety of apparatuses or devices. For example, at content creation time, a user may utilize a computing device to create combined media, including implementing the alignment or repositioning of media types as described herein. Such a computing device may take the form of a device including the example components outlined in FIG. 3.

Figure 3:
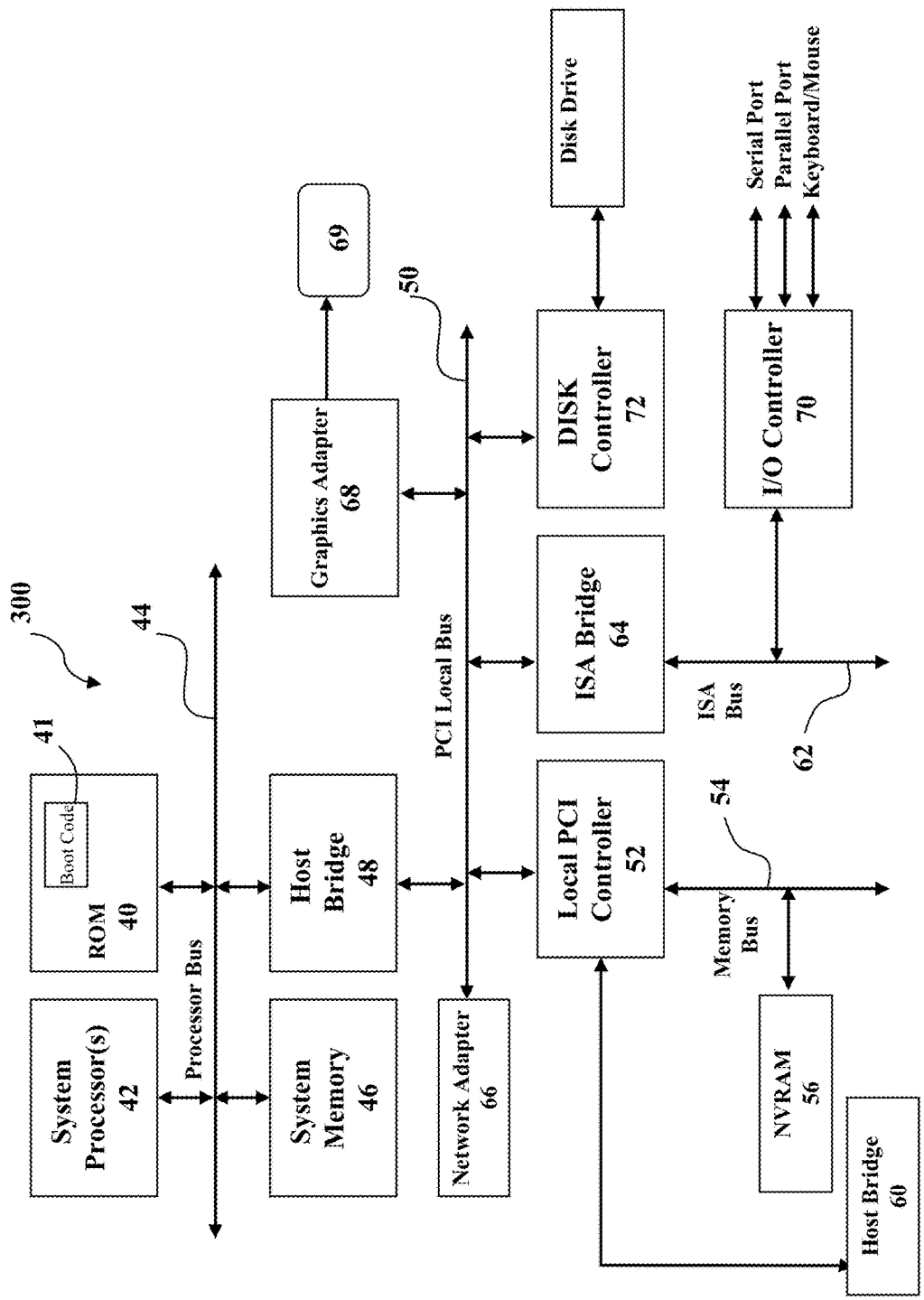
FIG. 3 illustrates an example apparatus for implementing compression aware media alignment.

In FIG. 3, there is depicted a block diagram of an illustrative embodiment of a computer system 300. The illustrative embodiment depicted in FIG. 1 may be an electronic device such as workstation computer, a desktop or laptop computer, or another type of computing device used to process media data such as high definition video data and graphics. As is apparent from the description, however, various embodiments may be implemented in any appropriately configured electronic device or computing system, as described herein.

As shown in FIG. 3, computer system 300 includes at least one system processor 42, which is coupled to a Read-Only Memory (ROM) 40 and a system memory 46 by a processor bus 44. System processor 42, which may comprise one of the AMD line of processors produced by AMD Corporation or a processor produced by INTEL Corporation, is a processor that executes boot code 41 stored within ROM 40 at power-on and thereafter processes data under the control of an operating system and application software stored in system memory 46, e.g., an application for aligning media types, as described herein. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 300 to LAN, and graphics adapter 68, which interfaces computer system 300 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 300 further includes Industry Standard Architecture (ISA) bus 62, which is coupled to PCI local bus 50 by ISA bridge 64. Coupled to ISA bus 62 is an input/output (I/O) controller 70, which controls communication between computer system 300 and attached peripheral devices such as a as a keyboard, mouse, serial and parallel ports, etc. A disk controller 72 connects a disk drive with PCI local bus 50. The USB Bus and USB Controller (not shown) are part of the Local PCI controller (52).

In addition to or as an alternative to the device or apparatus circuitry outlined above, as will be appreciated by one skilled in the art, various aspects of the embodiments described herein may be carried out using a system of another type, may be implemented as a device-based method or may embodied in a program product. Accordingly, aspects may take the form of an entirely hardware embodiment or an embodiment including software that may all generally be referred to herein as a "circuit," "module" or "system."

Furthermore, an embodiment may take the form of a program product embodied in one or more device readable medium(s) having device readable program code embodied therewith.

Any combination of one or more non-signal/non-transitory device readable storage medium(s) may be utilized. The storage medium may be a storage device including, for example, an electronic, magnetic, optical, electromagnetic, infrared, or semiconductor device, or any suitable combination of the foregoing. More specific examples of a storage device would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Program code embodied on a storage device may be transmitted using any appropriate medium, including but not limited to wireless, wireline, optical fiber cable, RF, etc., or any suitable combination of the foregoing.

Program code ("code") for carrying out operations may be written in any combination of one or more programming languages. The code may execute entirely on a single device, partly on a single device, as a stand-alone software package, partly on single device and partly on another device, or entirely on the other device. In some cases, the devices may be connected through any type of connection or network (wired or wireless), including a local area network (LAN) or a wide area network (WAN), or the connection may be made through other devices (for example, through the Internet using an Internet Service Provider) or through a hard wire connection, such as over a USB connection.

Example embodiments are described herein with reference to the figures, which illustrate example methods, devices and program products according to the various example embodiments. It will be understood that the actions and functionality illustrated or described may be implemented at least in part by program instructions or code. These program instructions or code may be provided to a processor of a device to produce a machine, such that the instructions or code, which execute via a processor of the device, implement the functions/acts specified.

The program instructions or code may also be stored in a storage device that can direct a device to function in a particular manner, such that the instructions or code stored in a device readable medium produce an article of manufacture including instructions which implement the functions/acts specified.

The program instructions or code may also be loaded onto a device to cause a series of operational steps to be performed on the device to produce a device implemented or device-based process or method such that the instructions or code which execute on the device provide processes/methods for implementing the functions/acts specified.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   identifying a first type of media and a second type of media;
   determining a compression technique to be used to compress a combined media created from the first type of media and the second type of media;
   identifying, based upon the compression technique determined, a location of a first compression region and identifying a second compression region bordering on the first compression region;
   determining, based upon the compression technique determined, if one of: the first type of media and the second type of media overlaps the border between the first compression region and the second compression region; and
   repositioning, based upon determining that one of: the first type of media and the second type of media overlaps the border, one of: the first type of media and the second type of media that overlaps the border to create the combined media, wherein the repositioning comprises repositioning the one of: the first type of media and the second type of media that overlaps the border to adjoin substantially coincident with the border so that the one of: the first type of media and the second type of media no longer overlaps the border.

2. The method of claim 1, wherein:
   the first type of media comprises video data; and
   the second type of media comprises a graphical element.

3. The method of claim 2, wherein the graphical element is a computer generated graphic overlaid on the video data.

4. The method of claim 1, further comprising initially combining the first type of media and the second type of media responsive to user inputs in a user interface.

5. The method of claim 4, wherein the repositioning comprises repositioning the second type of media to align an edge of the second type of media with a macro block position identified based on the compression technique determined.

6. The method of claim 1, wherein the repositioning proceeds automatically based on the compression technique determined.

7. The method of claim 1, wherein the repositioning occurs prior to compressing the combined media.

8. The method of claim 1, wherein the determining a compression technique comprises automatically selecting a standard compression technique.

9. The method of claim 1, further comprising:
compressing the combined media; and
transmitting the combined media in compressed form.

10. The method of claim 9, further comprising:
receiving compressed media;
decompressing the compressed media; and
thereafter performing the identifying, the determining, and the repositioning;
wherein the transmitting the combined media in compressed form comprises retransmitting compressed media that has been aligned.

11. An apparatus, comprising:
a processor; and
a memory storing instructions executable by the processor to:
identify a first type of media and a second type of media;
determine a compression technique to be used to compress a combined media created from the first type of media and the second type of media;
identify, based upon the compression technique determined, a location of a first compression region and identifying a second compression region bordering on the first compression region;
determine, based upon the compression technique determined, if one of: the first type of media and the second type of media overlaps the border between the first compression region and the second compression region; and
reposition, based upon determining that one of: the first type of media and the second type of media overlaps the border, one of: the first type of media and the second type of media that overlaps the border, wherein to reposition comprises repositioning the one of: the first type of media and the second type of media that overlaps the border to adjoin substantially coincident with the border so that the one of: the first type of media and the second type of media no longer overlaps the border.

12. The apparatus of claim 11, wherein:
the first type of media comprises video data; and
the second type of media comprises a graphical element.

13. The apparatus of claim 12, wherein the graphical element is a computer generated graphic overlaid on the video data.

14. The apparatus of claim 11, wherein the instructions are further executable by the processor to initially combine the first type of media and the second type of media responsive to user inputs in a user interface.

15. The apparatus of claim 14, wherein to reposition comprises repositioning the second type of media to align an edge of the second type of media with a macro block position identified based on the compression technique determined.

16. The apparatus of claim 11, wherein the repositioning proceeds automatically based on the compression technique determined.

17. The apparatus of claim 11, wherein the repositioning occurs prior to compressing the combined media.

18. The apparatus of claim 11, wherein to determine a compression technique comprises automatically selecting a standard compression technique.

19. The repositioning of claim 11, wherein the instructions are further executable by the processor to:
compress the combined media; and
transmit the combined media in compressed form.

20. A product, comprising:
a storage device storing code executable by a processor of an apparatus, the code comprising:
code that identifies a first type of media and a second type of media;
code that determines a compression technique to be used to compress a combined media created from the first type of media and the second type of media;
code that identifies, based upon the compression technique determined, a location of a first compression region and identifies a second compression region bordering on the first compression region;
code that determines, based upon the compression technique determined, if one of: the first type of media and the second type of media overlaps the border between the first compression region and the second compression region; and
code that repositions, based upon determining that one of: the first type of media and the second type of media overlaps the border, one of: the first type of media and the second type of media that overlaps the border, wherein the code that repositions comprises code that repositions the one of: the first type of media and the second type of media that overlaps the border to adjoin substantially coincident with the border so that the one of: the first type of media and the second type of media no longer overlaps the border.

21. The method of claim 1, wherein a total number of compression regions overlapped by the one of: the first type of media and the second type of media is reduced by the repositioning.

* * * * *